(12) United States Patent
Wang et al.

(10) Patent No.: US 11,537,225 B2
(45) Date of Patent: Dec. 27, 2022

(54) FUNCTIONAL MODULE AND DISPLAY DEVICE HAVING THE SAME

(71) Applicant: E Ink Holdings Inc., Hsinchu (TW)

(72) Inventors: Chao-Jen Wang, Hsinchu (TW); Jen-Pin Yu, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 17/170,864

(22) Filed: Feb. 8, 2021

(65) Prior Publication Data

US 2021/0365133 A1 Nov. 25, 2021

(30) Foreign Application Priority Data

May 20, 2020 (TW) ................................ 109116787

(51) Int. Cl.
*G06F 3/041* (2006.01)
*F21V 8/00* (2006.01)

(52) U.S. Cl.
CPC ............ *G06F 3/041* (2013.01); *G06F 3/0412* (2013.01); *G02B 6/0011* (2013.01)

(58) Field of Classification Search
CPC .................. G06F 3/041; G06F 3/0412; G06F 2203/04103; G02B 6/0011
See application file for complete search history.

(56) References Cited

U.S. PATENT DOCUMENTS

| | | | |
|---|---|---|---|
| 8,952,935 B2 | 2/2015 | Huang et al. | |
| 9,423,830 B1 | 8/2016 | Wei et al. | |
| 9,541,965 B1* | 1/2017 | Mukherjee | ............ G06F 1/1637 |
| 9,811,188 B1 | 11/2017 | Subbarayan et al. | |
| 10,073,211 B1 | 9/2018 | Almanza-Workman et al. | |
| 2015/0004382 A1 | 1/2015 | Menon et al. | |
| 2015/0101853 A1* | 4/2015 | Lee | ...................... H05K 1/0274 |
| | | | 174/268 |
| 2015/0378077 A1 | 12/2015 | Haag et al. | |
| 2016/0291238 A1 | 10/2016 | Tai et al. | |
| 2017/0299937 A1 | 10/2017 | Jen et al. | |
| 2018/0165497 A1* | 6/2018 | Lee | ...................... H01L 27/323 |

FOREIGN PATENT DOCUMENTS

| | | |
|---|---|---|
| CN | 103688310 A | 3/2014 |
| CN | 104282225 A | 1/2015 |
| CN | 104423577 A | 3/2015 |
| CN | 102736776 B | 1/2016 |
| CN | 107631204 A | 1/2018 |
| CN | 108538196 A | 9/2018 |
| CN | 208314745 U | 1/2019 |
| TW | I581023 B | 5/2017 |
| TW | 201942728 A | 11/2019 |

OTHER PUBLICATIONS

Corresponding Taiwan office action dated Apr. 19, 2021.
The office action of corresponding CN application No. 202010430229.4 dated Nov. 2, 2022.

* cited by examiner

*Primary Examiner* — Sahlu Okebato
(74) *Attorney, Agent, or Firm* — CKC & Partners Co., LLC

(57) ABSTRACT

A functional module is applied in a front light module of a display device. The functional module includes a composite cover structure having a first plate and a second plate and a reflective display panel. The second plate is located between the first plate and the reflective display panel. At least one medium layer is located between the first plate of the composite cover structure and the reflective display panel. The refractive index of the medium layer is greater than or equal to 1 and is smaller than 1.474.

7 Claims, 19 Drawing Sheets

|  | | | | | | | |
|---|---|---|---|---|---|---|---|
| Front light module OFF | F | 8.221% | 8.675% | 9.127% | 17.696% | 8.413% | 5.844% |
| | F+F' | 92.455% | 92.078% | 91.706% | 85.436% | 92.295% | 94.497% |
| | (F+F')/F | 11.25 | 10.61 | 10.05 | 4.83 | 10.97 | 16.17 |
| Front light module ON | N | 46.014% | 45.787% | 45.561% | 41.271% | 46.118% | 47.204% |
| | N+N' | 91.844% | 91.390% | 90.938% | 82.369% | 91.757% | 94.221% |
| | (N+N')/N | 2.00 | 2.00 | 2.00 | 2.00 | 1.99 | 2.00 |
| | ΔCR | 9.25 | 7.39 | 8.05 | 2.83 | 8.98 | 14.17 |

Fig. 6

| | Optical contrast CROFF | Optical contrast CRON | Variation of the optical contrast ΔCR |
|---|---|---|---|
| Front light module OFF | 15.64 | 16.09 | 15.83 | 14.31 |
| Front light module ON | 13.75 | 15.58 | 15.38 | 16.05 |
| | -12.1% | -3.2% | -2.8% | 12.1% |

Fig. 9

| Air | 1 | Air | 1 | Air | 1 |
|---|---|---|---|---|---|
| First plate | 1.6407 | First plate | 1.6407 | First plate | 1.6407 |
| Optical adhesive layer | 1.474 | Medium layer | 1.41 | Optical adhesive layer | 1.474 |
| Second plate | 1.5842 | Second plate | 1.5842 | Second plate | 1.5842 |
| Optical adhesive layer | 1.474 | Optical adhesive layer | 1.474 | Medium layer | 1.41 |
| Electrode layer | 1.8246 | Electrode layer | 1.8246 | Electrode layer | 1.8246 |
| Touch layer | 1.6407 | Touch layer | 1.6407 | Touch layer | 1.6407 |
| Medium layer | 1.41 | Optical adhesive layer | 1.474 | Optical adhesive layer | 1.474 |
| Light guide plate | 1.5842 | Light guide plate | 1.5842 | Light guide plate | 1.5842 |
| Optical adhesive layer | 1.474 | Optical adhesive layer | 1.474 | Optical adhesive layer | 1.474 |
| Reflective display panel | NA | Reflective display panel | NA | Reflective display panel | NA |
| Effective refractive index | 1.268 | Effective refractive index | 1.268 | Effective refractive index | 1.256 |

Fig. 10

| Layer | Index | Layer | Index | Layer | Index | Layer | Index |
|---|---|---|---|---|---|---|---|
| Air | 1 | Air | 1 | Air | 1 | Air | 1 |
| First plate | 1.6407 | First plate | 1.6407 | First plate | 1.6407 | First plate | 1.6407 |
| Medium layer | 1.41 | Optical adhesive layer | 1.41 | Medium layer | 1.474 | Medium layer | 1.41 |
| Second plate | 1.5842 | Second plate | 1.5842 | Second plate | 1.5842 | Second plate | 1.5842 |
| Optical adhesive layer | 1.474 | Medium layer | 1.41 | Medium layer | 1.41 | Medium layer | 1.41 |
| Electrode layer | 1.8246 | Electrode layer | 1.8246 | Electrode layer | 1.8246 | Electrode layer | 1.8246 |
| Touch layer | 1.6407 | Touch layer | 1.6407 | Touch layer | 1.6407 | Touch layer | 1.6407 |
| Medium layer | 1.41 | Medium layer | 1.474 | Optical adhesive layer | 1.41 | Medium layer | 1.41 |
| Light guide plate | 1.5842 | Light guide plate | 1.5842 | Light guide plate | 1.5842 | Light guide plate | 1.5842 |
| Optical adhesive layer | 1.474 | Optical adhesive layer | 1.474 | Optical adhesive layer | 1.474 | Optical adhesive layer | 1.474 |
| Reflective display panel | NA | Reflective display panel | NA | Reflective display panel | NA | Reflective display panel | NA |
| Effective refractive index | 1.232 | Effective refractive index | 1.243 | Effective refractive index | 1.232 | Effective refractive index | 1.21 |

Fig. 15

|  | Optical contrast CR$_{OFF}$ | Optical contrast CR$_{ON}$ | Variation of the optical contrast ΔCR |
|---|---|---|---|
| Front light module OFF | 16.93 | 15.29 | -9.7% |
| Front light module ON | 15.56 | 18.33 | 17.9% |

Fig. 18

FUNCTIONAL MODULE AND DISPLAY DEVICE HAVING THE SAME

CROSS-REFERENCE TO RELATED APPLICATION

This application claims priority to Taiwan Application Serial Number 109116787, filed May 20, 2020, which is herein incorporated by reference in its entirety.

BACKGROUND

Field of Invention

The present invention relates to a display device. More particularly, the present invention relates to a display device having a functional module.

Description of Related Art

For a display device utilizing a front light module, there are two methods to increase the optical contrast. When the front light module is off, an anti-glare layer may be disposed on the surface of the display device such that the ratio of the ambient light reaches the reflective display panel can be increased. When the front light module is on, the light can be emitted from the upper side and the lower side of the light guide plate asymmetrically so as to increase the optical contrast when the front light module is turned on.

However, when the front light module is turned on, the light entering the light guide plate forms a surface source such that the optical contrast when the front light module is turned on becomes worse. In addition, the variation of the optical contrast of the display device is increased by disposing an anti-glare layer that may increase the optical contrast when the front light module is turned off, such that the scene experience of users may be degraded. In other words, the conventional methods for increasing the optical contrast when the front light module is respectively turned on and turned off may be conflict with each other, and the variation of the optical contrast when the front light module is respectively turned on and turned off may be even increased.

In addition, besides the optical properties, since the complexity of the laminated structure of the display device is greater, adjustment of the variation of the optical contrast may become more difficult if there are more layers. Accordingly, how to provide a display device of which the variation of the optical contrast can be reduced and the complexity of the laminated structure of the display device will not be increased is still a development direction for the industry.

SUMMARY

One aspect of the present disclosure is a functional module.

In some embodiments, the functional module is applied in a front light module of a display device. The functional module includes a composite cover structure having a first plate and a second plate and a reflective display panel. The second plate is located between the first plate and the reflective display panel. At least one medium layer is located between the first plate of the composite cover structure and the reflective display panel. The refractive index of the medium layer is greater than or equal to 1 and is smaller than 1.474.

In some embodiments, the medium layer is located between the first plate and the second plate.

In some embodiments, the functional module further includes a touch module located between the composite cover structure and the reflective display panel, and the medium layer is located between the composite cover structure and the touch module or located between the touch module and the reflective display panel.

In some embodiments, a number of the at least one medium layer is two. The display device further includes a touch module located between the composite cover structure and the reflective display panel. One of the two medium layer is located between the first plate and the second plate, and another one of the medium layer is located between the touch module and the reflective display panel.

In some embodiments, a number of the at least one medium layer is two. The display device further includes a touch module located between the composite cover structure and the reflective display panel. One of the two medium layer is located between the second plate and the touch module, and another one of the medium layer is located between the touch module and the reflective display panel.

In some embodiments, the display device further includes a touch module located between the composite cover structure and the reflective display panel. A number of the medium layer is three, and the three medium layers are respectively located between the first plate and the second plate, between the touch module and the second plate, and between the touch module and the reflective display panel.

Another aspect of the present disclosure is a display device.

In some embodiments, a display device includes a front light module having a light guide plate and a light source and a functional module. The function module includes a composite cover structure having a first plate and a second plate, a reflective display panel, and at least one medium layer. The front light module is located between the first plate and the reflective display panel. The medium layer is located between the first plate of the composite cover structure and the light guide plate. The refractive index of the medium layer is greater than or equal to 1 and is smaller than 1.474.

In some embodiments, the medium layer is located between the first plate and the second plate.

In some embodiments, the functional module further includes a touch module located between the composite cover structure and the reflective display panel, and the medium layer is located between the composite cover structure and the touch module or located between the touch module and the reflective display panel.

In some embodiments, a number of the at least one medium layer is two. The display device further includes a touch module located between the composite cover structure and the reflective display panel. One of the two medium layer is located between the first plate and the second plate, and another one of the medium layer is located between the touch module and the reflective display panel.

In some embodiments, a number of the at least one medium layer is two. The display device further includes a touch module located between the composite cover structure and the reflective display panel. One of the two medium layer is located between the second plate and the touch module, and another one of the medium layer is located between the touch module and the reflective display panel.

In some embodiments, the display device further includes a touch module located between the composite cover structure and the reflective display panel. A number of the medium layer is three, and the three medium layers are respectively located between the first plate and the second plate, between the touch module and the second plate, and between the touch module and the reflective display panel.

In some embodiments, the medium layer is an air layer.

In some embodiments, the air layer is located between the first plate and the second plate of the composite cover structure.

In some embodiments, the display device further includes a touch module located between the composite cover structure and the light guide plate. The air layer is located between the touch module and the light guide plate.

In the aforementioned embodiments, the optical contrast when the front light module is turned on and the optical contrast when the front light module is turned off may be balanced by replacing the conventional optical adhesive layer (refractive index 1.474) with the medium layer of which the refractive index is greater than or equal to one and is smaller than 1.474. In some embodiments, the display device of the present disclosure can enhance the optical contrast when the front light module is turned on through the medium layer. In addition, since the complexity of the laminated structure of the display device will not be increased by replacing the conventional optical adhesive layer with the medium layer, the difficulty for adjusting the variation of the optical contrast will not be increased and the original mechanism design of the display device will not be damaged.

BRIEF DESCRIPTION OF THE DRAWINGS

The invention can be more fully understood by reading the following detailed description of the embodiment, with reference made to the accompanying drawings as follows:

FIG. 6 is a simulation data of an optical contrast and a variation of the optical contrast according to various embodiments of the present disclosure;

FIG. 9 is experiment data of the optical contrast and the variation of the optical contrast according to various embodiments in FIG. 6;

FIG. 10 is simulation data of the refractive index according to the display devices in FIG. 1, FIG. 7, and FIG. 8;

FIG. 15 is simulation data of the refractive index according to the display devices in FIG. 11, FIG. 12, FIG. 13, and FIG. 14;

FIG. 18 is experiment data of the optical contrast and the variation of the optical contrast according to various embodiments in FIG. 16 and FIG. 17.

DETAILED DESCRIPTION

Figure 1:
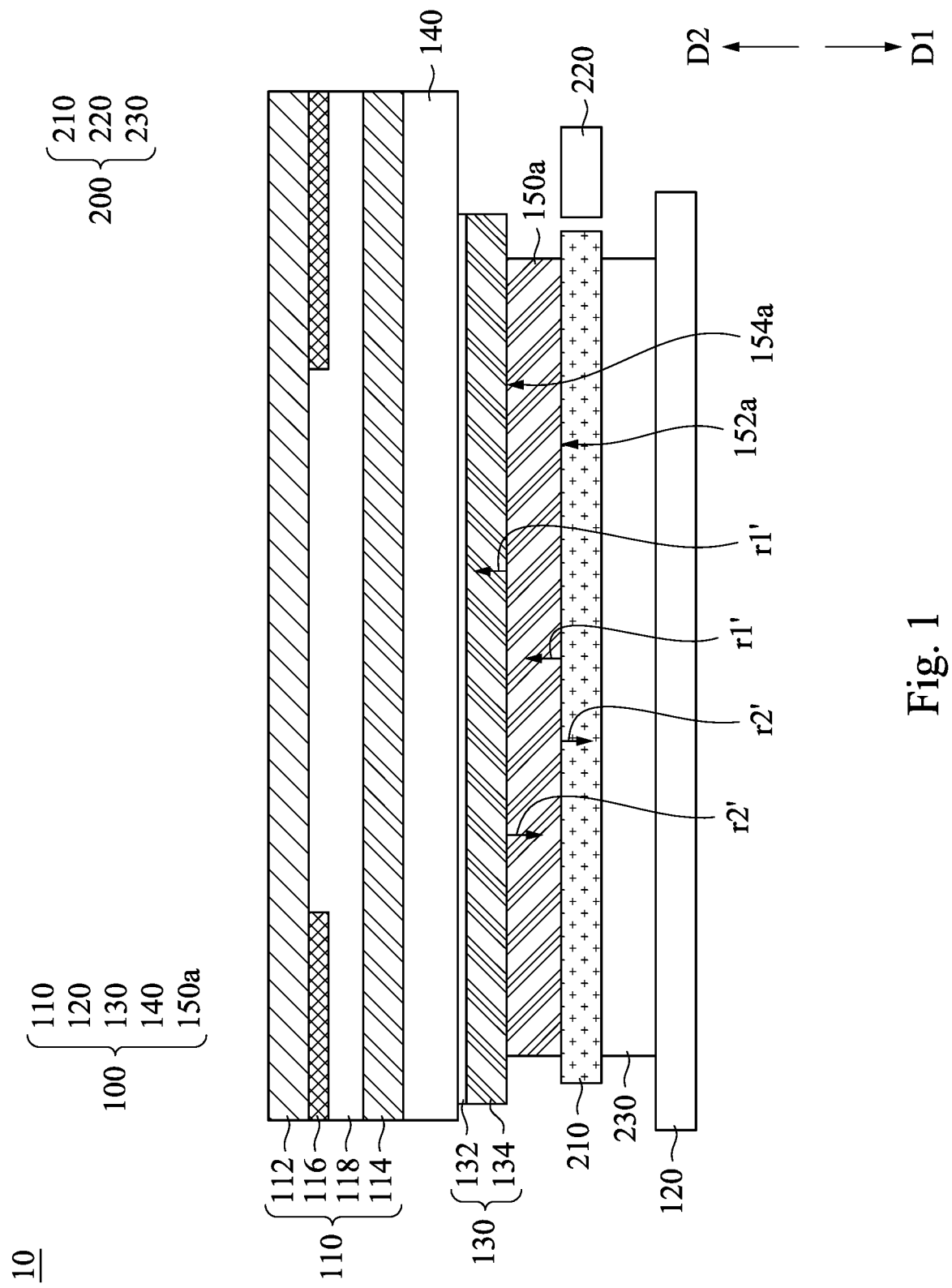
FIG. 1 is a cross-sectional view of a display device according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

FIG. 1 is a cross-sectional view of a display device 10 according to one embodiment of the present disclosure. The display device 10 includes a functional module 100 and a front light module 200. The function module 100 includes a composite cover structure 110, a reflective display panel 120, a touch module 130, an optical adhesive layer 140, and a medium layer 150a. The front light module 200 is located between the composite cover structure 110 and the reflective display panel 120. In the present embodiment, the touch module 130 is located between the composite cover structure 110 and the front light module 200, but the present disclosure is not limited in this regard. In some other embodiment, the touch module 130 may located at another side of the light guide plate 210.

The composite cover structure 110 includes a first plate 112 and a second plate 114, a printing layer 116, and an optical adhesive layer 118. The optical adhesive layer 118 is located between the first plate 112 and the second plate 114. In the present embodiment, the printing layer 116 is located on the surface of the first plate 112 facing the second plate 114, and the printing layer 116 is in contact with the optical adhesive layer 118, but the present disclosure is not limited in this regard. For example, in some embodiments, a number of the printing layer 116 is two, and the two printing layer 116 are respectively located on the bottom surface of the first plate 112 and the second plate 114. The touch module 130 includes an electrode layer 132 and a touch layer 134. The front light module 200 includes a light guide plate 210, a light source 220, and an optical adhesive layer 230. The optical adhesive layer 230 is located between the light guide plate 210 and the reflective display panel 120.

The optical adhesive layer 140 is located the second plate 114 of the composite cover structure 110 and the electrode layer 132 of the touch module 130. The medium layer 150a is located between the touch module 130 and the light guide plate 210. The refractive index of the medium layer 150a is greater than 1 and is smaller than 1.474. In the present embodiment, medium layer 150a may be an optical adhesive layer including silicon-based material, and the refractive index of the medium layer 150a is about 1.41, but the present disclosure is not limited in this regard. In other embodiments, the medium layer 150a may be a transparent coating material of which the refractive index is greater than or equal to 1 and is smaller than 1.474. The optical adhesive layer 118, the optical adhesive layer 140, and the front light module 200 of the composite cover structure 110 and the optical adhesive layer 230 are optical adhesive layer including acrylic resin, and the refractive index of the optical adhesive layer 118, the optical adhesive layer 140, and the optical adhesive layer 230 are about 1.474. In other words, the refractive index of the medium layer 150a is smaller than the refractive index of the conventional optical adhesive layer. That is, the difference between the refractive index of the medium layer 150a and the refractive index of the touch module 130 is increased, and the difference between the refractive index of the medium layer 150a and the refractive index of the light guide plate 210 is also increased.

In the subsequent paragraphs, the variation of the optical contrast represents the difference between the optical contrast of the display device 10 when the front light module 200 is turned off and the optical contrast of the display device 10 when the front light module 200 is turned on. The optical contrast when the front light module 200 is turned off represents the ratio between the brightness of bright state (that is when the screen of the reflective display panel 120 is white completely) and the dark state (that is when the screen of the reflective display panel 120 is black completely) when the front light module 200 is turned off. The optical contrast when the front light module 200 is turned on represents the ratio between the brightness of bright state and the dark state when the front light module 200 is turned on. The display device 10 of the present disclosure may balance the optical contrasts when the front light module 200 is turned on and turned off through the medium layer 150a so as to reduce the variation of the optical contrast. In the subsequent paragraphs, the simulation data and the experiment data of the optical contrast will be described along with figures so as to explain the aforementioned theory and advantages of the display device 10.

FIGS. 2 to 5 are respectively cross-sectional views of an exemplary display device at different state. In FIGS. 2 to 5, elements the same as the elements of the display device 10 in FIG. 1 will be represents with the same label. The display devices shown in FIGS. 2 to 5 includes optical adhesive layer 150 having acrylic resin, and the display devices have no medium layers 150a as shown in FIG. 1. In other words, the refractive indexes of the optical adhesive layers 118, 140, 150, 230 in FIGS. 2 to 5 are all 1.474 for calculating the optical contrast of the conventional display device. In addition, the first plates 112 in FIGS. 2 to 5 include Polyethylene terephthalate (PET), for example, and the refractive indexes of the first plates 112 are about 1.64. The second plate 114 and the light guide plate 210 include Polycarbonate (PC), for example, and the refractive index is about 1.58. The electrode layer 132 includes transparent electrode material (e.g., ITO), for example, and the refractive index is about 1.82. It is noted that, in the subsequent simulation and calculation, only the perpendicular incident and reflection are considered, and the polarization, multiple reflection, the refraction, and the absorption coefficient are neglected. In addition, since the simulation data is the values simulated from different conditions of various display devices under idealized conditions, the real physical parameters may not be shown. Therefore, in the following descriptions, ratios between the simulation data derived from different conditions of various display devices are utilized as a comparison criteria.

Figure 2:
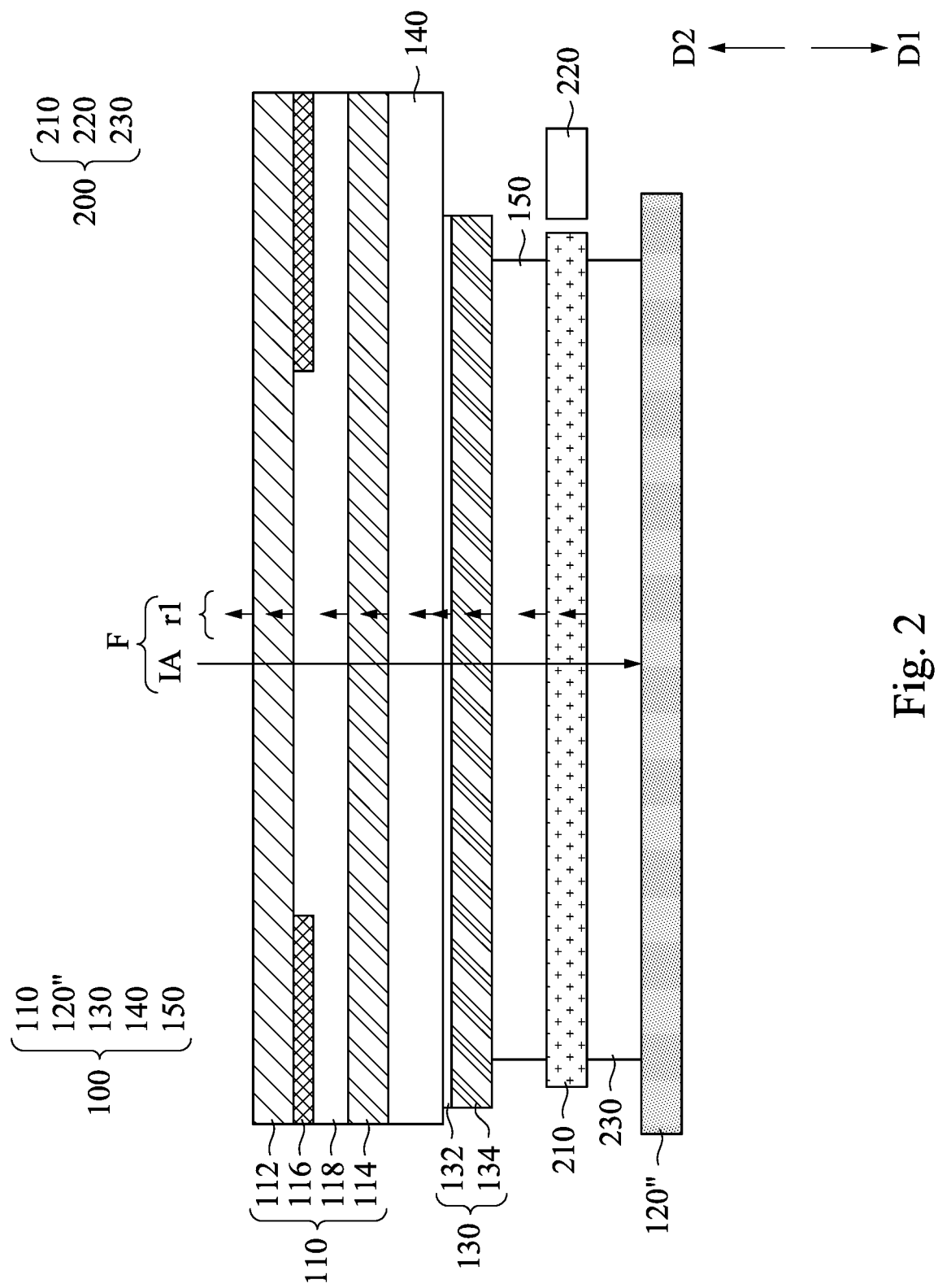
FIG. 2 is a cross-sectional view of an exemplary display device, and the front light module is off and the reflective display panel is in dark state.

FIG. 2 is a cross-sectional view of an exemplary display device, the front light module 200 is turned off, and the reflective display panel 120" is in dark state. As shown in FIG. 2, the ambient incident light IA transmits toward the reflective display panel 120" from air, that is the ambient incident light IA transmits toward the reflective display panel 120" from the composite cover structure 110 along the first direction D1. When the ambient incident light IA passes through each of the interfaces between adjacent structures, partial transmission and partial reflection of the ambient incident light IA may occur due to difference of the refractive indexes. The ambient incident light IA passes through nine interfaces totally, and a sum of these nine reflection lights along the second direction D2 is represented by the interface reflection light r1. Since the reflective display panel 120" is in dark state, the portion of the ambient incident light IA transmitted to the reflective display panel 120" is absorbed. Under idealized conditions, the remaining portion of the ambient incident light IA transmitted to the reflective display panel 120" is absorbed completely. The light flux F(r1) represents the sum of the light flux reaches instruments or human eyes when the front light module 200 is turned off and the display device is in dark state. That is, the sum of the light flux along the second direction D2.

Figure 3:
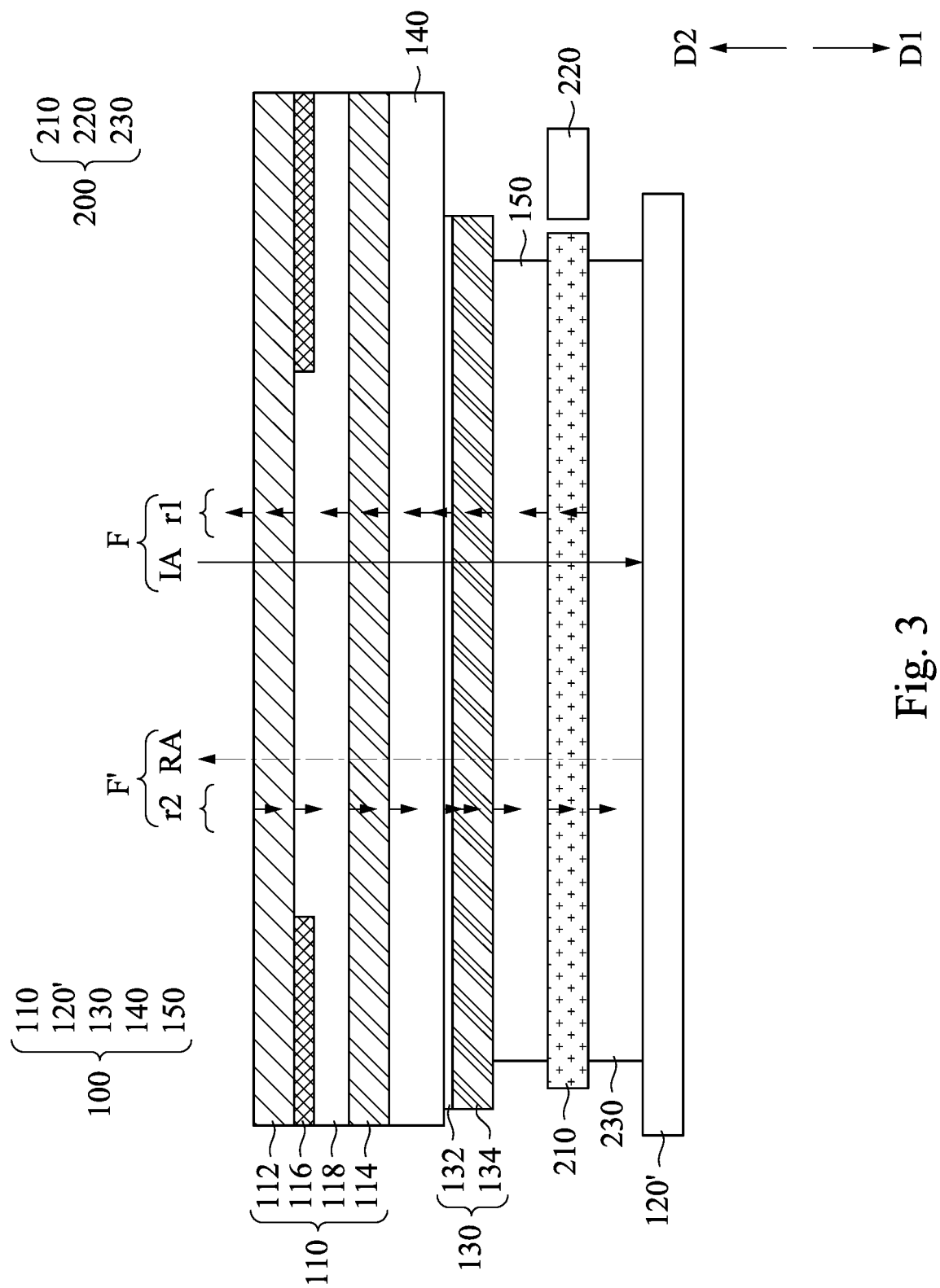
FIG. 3 is a cross-sectional view of an exemplary display device, and the front light module is on and the reflective display panel is in bright state.

FIG. 3 is a cross-sectional view of an exemplary display device, the front light module 200 is turned off, and the reflective display panel 120' is in bright state. As shown in FIG. 3, when the ambient incident light IA passes through each of the interfaces between adjacent structures, partial transmission and partial reflection of the ambient incident light IA may occur due to difference of the refractive indexes. Since the reflective display panel 120" is in bright state, the portion of the ambient incident light IA transmitted to the reflective display panel 120" is reflected. Under idealized conditions, the remaining portion of the ambient incident light IA transmitted to the reflective display panel 120" is reflected completely such that a reflection light RA along the second direction D2 is formed. However, when the reflection light RA passes through each of the interfaces between adjacent structures, partial transmission and partial reflection of the reflection light RA may occur due to difference of the refractive indexes. The reflection light RA passes through nine interfaces totally, and a sum of these nine reflection lights along the first direction D1 is represented by the interface reflection light r2. The light flux F'(RA) represents the sum of the light flux of the light reflected by the reflective display panel 120' reaches instruments or human eyes when the front light module 200 is turned off and the display device is in bright state. Accordingly, the light flux F(r1)+F'(RA) represents the sum of the light flux reaches instruments or human eyes when the front light module 200 is turned off and the display device is in bright state. The optical contrast of the display device when the front light module 200 is turned off may be calculated through the boundary conditions as shown in FIG. 2 and FIG. 3, and the optical contrast is equal to the value of the light flux F(r1)+F'(RA) over the light flux F(r1).

Figure 4:
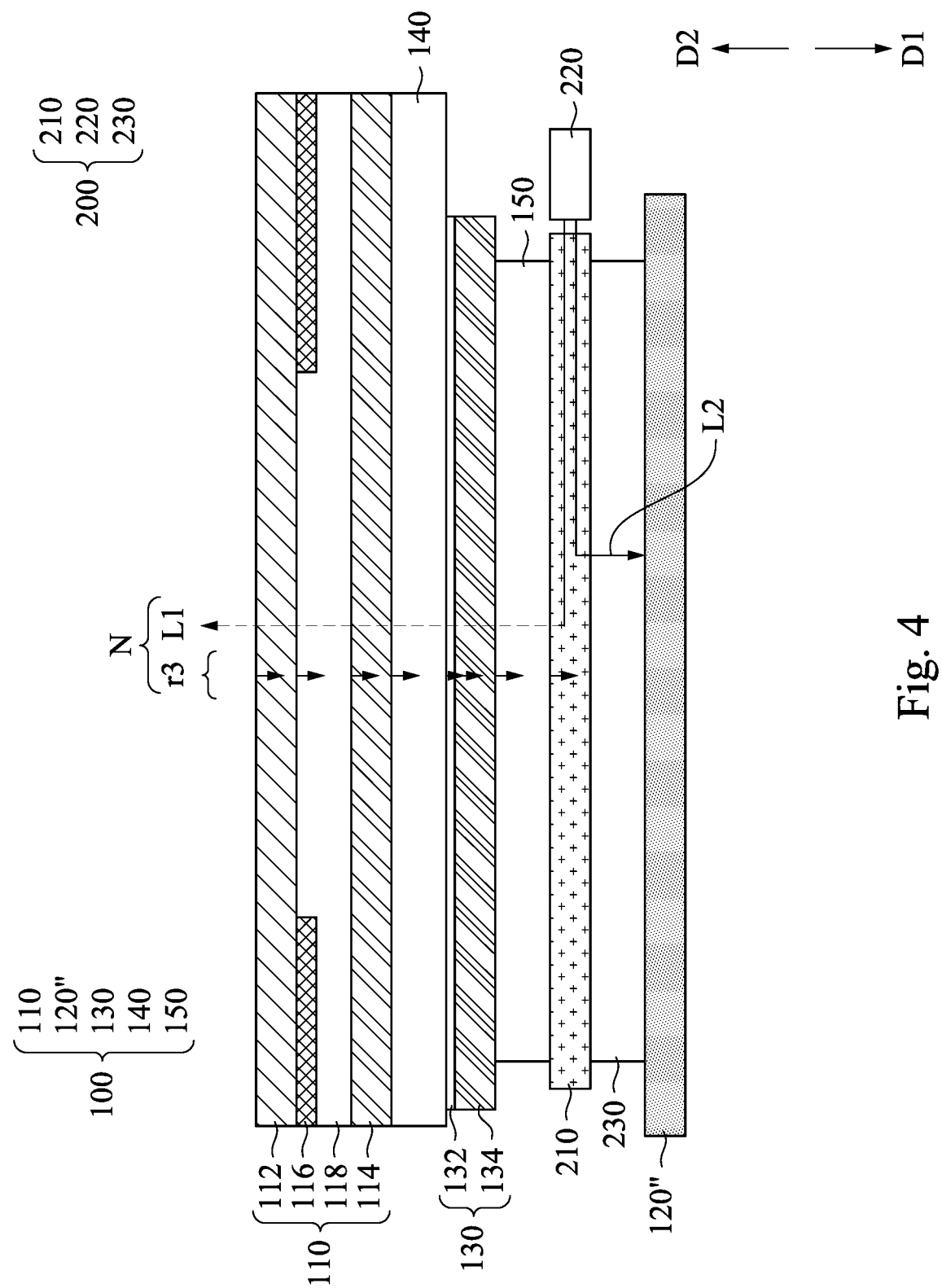
FIG. 4 is a cross-sectional view of an exemplary display device, and the front light module is off and the reflective display panel is in dark state.

FIG. 4 is a cross-sectional view of an exemplary display device, the front light module 200 is turned on, and the reflective display panel 120" is in dark state. When the front light module 200 is turned on, the light intensity from the light source 220 is far greater than the ambient light intensity. Therefore, the ambient light intensity may be neglected. A portion of the light L1 of the front light module 200 passes through the light guide plate 210 is guided to transmit along the second direction D2, and another portion of the light L2 transmit to the reflective display panel 120" along the first direction D1. Since the reflective display panel 120" is in dark state, the light L2 transmits to the reflective display panel 120" will be absorbed completely under idealized condition. When the light L1 passes through each of the interfaces between adjacent structures, partial transmission and partial reflection of the reflection light RA may occur due to difference of the refractive indexes. The light L1 passes through eight interfaces totally, and a sum of the reflection lights from these eight interfaces along the first direction D1 is represented by the interface reflection light r3. The light flux N(L1) represents the sum of the light flux reaches instruments or human eyes when the front light module 200 is turned on and the display device is in dark state. That is, the sum of the light flux along the second direction D2.

Figure 5:
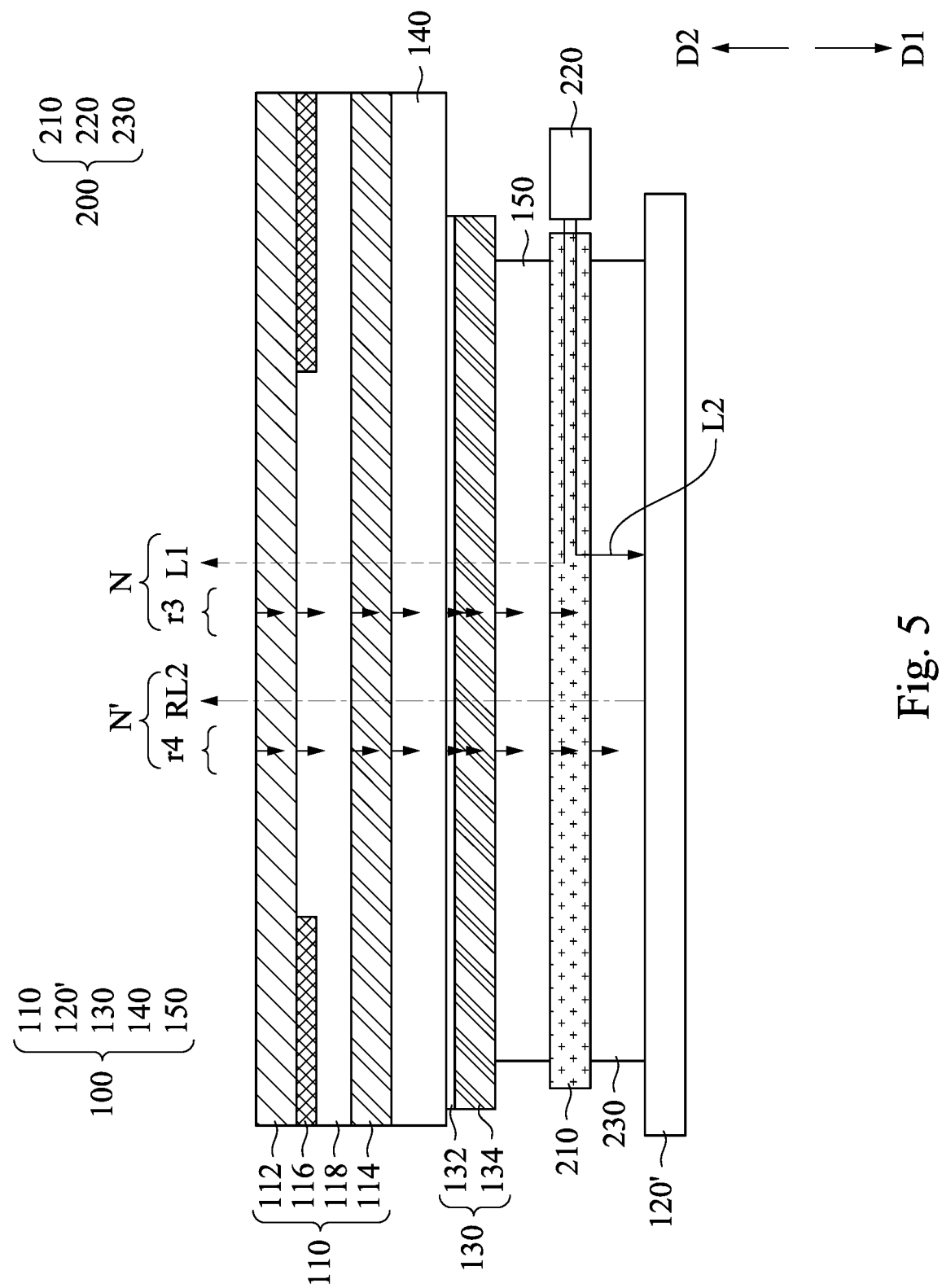
FIG. 5 is a cross-sectional view of an exemplary display device, and the front light module is on and the reflective display panel is in bright state.

FIG. 5 is a cross-sectional view of an exemplary display device, the front light module 200 is turned on, and the reflective display panel 120' is in bright state. Since the reflective display panel 120' is in bright state, the portion of the light L2 transmitted to the reflective display panel 120' is reflected. Under idealized conditions, the remaining portion of the light L2 transmitted to the reflective display panel 120' is reflected completely such that a reflection light RL2 along the second direction D2 is formed. However, when the light RL2 passes through each of the interfaces between adjacent structures, partial transmission and partial reflection of the reflection light RL2 may occur due to difference of the refractive indexes. The reflection light RL2 passes through nine interfaces totally, and a sum of these nine reflection lights along the first direction D1 is represented by the interface reflection light r4. The light flux N'(RL2) represents the sum of the light flux of the light reflected by the reflective display panel 120' reaches instruments or human eyes. Accordingly, the light flux N(L1)+N'(RL2) represents the sum of the light flux reaches instruments or human eyes when the front light module 200 is turned on and the display device is in bright state. The optical contrast of the display device when the front light module 200 is turned on may be calculated through the boundary conditions as shown in FIG. 4 and FIG. 5, and the optical contrast is equal to the value of the light flux N(L1)+N'(RL2) over the light flux N(L1).

Reference is made to FIG. 6, and FIG. 6 is a simulation data of an optical contrast and a variation of the optical contrast according to various embodiments of the present disclosure. The light flux F, light flux F+F', and the optical contrast (F+F')/F in FIG. 6 are derived from the boundaries shown in FIG. 2 and FIG. 3. The light flux N, light flux (N+N'), and the optical contrast (N+N')/N are derived from the boundaries shown in FIG. 4 and FIG. 5. The variation of the optical contrast ΔCR represents the difference between the optical contrast (N+N')/N when the front light module 200 is turned on and the optical contrast (F+F')/F when the font light module 200 is turned off.

The data in third column in FIG. 6 represents the simulation data based on the conventional display devices shown in FIGS. 2 to 5. The data in fourth column in FIG. 6 represents the simulation data based on the display device 10 shown in FIG. 1. According to the data in third column and the fourth column, the optical contrast (F+F')/F of the display device 10 when the front light module 200 is turned off is reduced a little compare to the optical contrast (F+F')/F of the conventional display device. In addition, the optical contrast (N+N') of the display device 10 when the front light module 200 is remained at value substantially equal to the optical contrast (N+N') of the conventional display device.

Reference is made to FIG. 1 and FIG. 2, since the refractive index of the medium layer 150a is lower than the refractive index of the optical adhesive layer 150 in FIG. 2, the difference of the refractive indexes between the medium layer 150a and the adjacent structure such that the refractive index of the interface is increased. As shown in FIG. 1, the interface reflection lights r1' from interface 152a and the interface 154a of the medium layer 150a which respectively faces and is in contact with the light guide plate 210 and the touch layer 134 are increased, such that the display device 10 has greater interface reflection light r1 (see FIG. 2). In other words, the interface reflection light r1 (see FIG. 2) is increased such that the light flux F(r1) is increased, thereby reducing the reflection light transmitted to the reflective display panel 120. Similarly, as shown in FIG. 1, the interface reflection light r3 (see FIG. 4) is increased such that the light flux N(L1) is reduced, and the interface reflection light r4 (see FIG. 5) is increased such that the light flux N'(RL2) is reduced. Therefore, the optical contrast (N+N')/N of the display device 10 when the front light module 200 is turned on is remained at a value substantially the same.

Reference is made to FIG. 6, the simulation data of the variation of the optical contrast ΔCR of the conventional display device is about 9.25, and the simulation data of the variation of the optical contrast ΔCR of the display device 10 in FIG. 1 is about 7.39. Accordingly, the simulation data of the optical contrast ΔCR shows the same trend as the variations of the optical contrast (F+F')/F of the display device 10 when the front light module 200 is turned off and the optical contrast (N+N')/N when the front light module 200 is turned on. In other words, the variation of the optical contrast ΔCR of the display device 10 may be reduced by disposing the medium layer 150a with lower refractive index between the light guide plate 210 and the composite cover structure 110, thereby improving the scene experience of the users.

Figure 7:
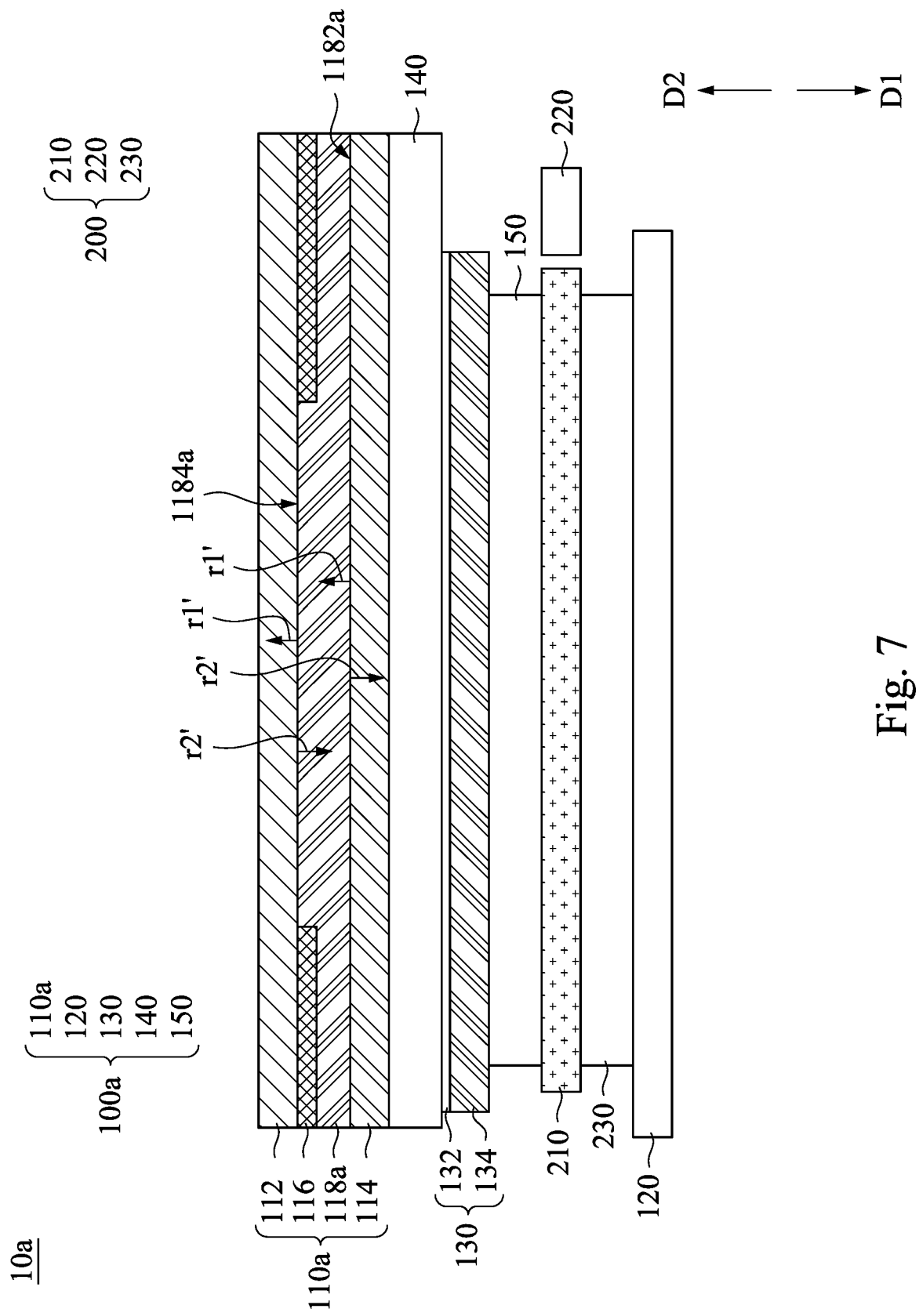
FIG. 7 is a cross-sectional view of a display device according to another embodiment of the present disclosure.

FIG. 7 is a cross-sectional view of a display device 10a according to another embodiment of the present disclosure. The display device 10a is substantially the same as the display device 10 shown in FIG. 1, and the difference is that the composite cover structure 110a of the display device 10a includes a medium layer 118a between the first plate 112 and the second plate 114. The display device 10a has no medium layer 150a (see FIG. 1) located between the light guide plate 210 and the touch module 130, but has an optical adhesive layer 140. Therefore, the medium layer 118a has an interface 1182a and an interface 1184a respectively faces and is in contact with the second plate 114 and the first plate 112. The interface 1182a and the interface 1184a may increase the reflection light r1' such that the interface reflection light r1 (see FIG. 2) is increased. The interface 1182a and interface 1184a may increase the reflection light r2' such that the interface reflection light r2 (see FIG. 3) is increased. The variation trend of the display device 10a when the front light module 200 is respectively turned on and turned off are the same as that of the display device 10, and the description will not be repeated hereinafter.

Figure 8:
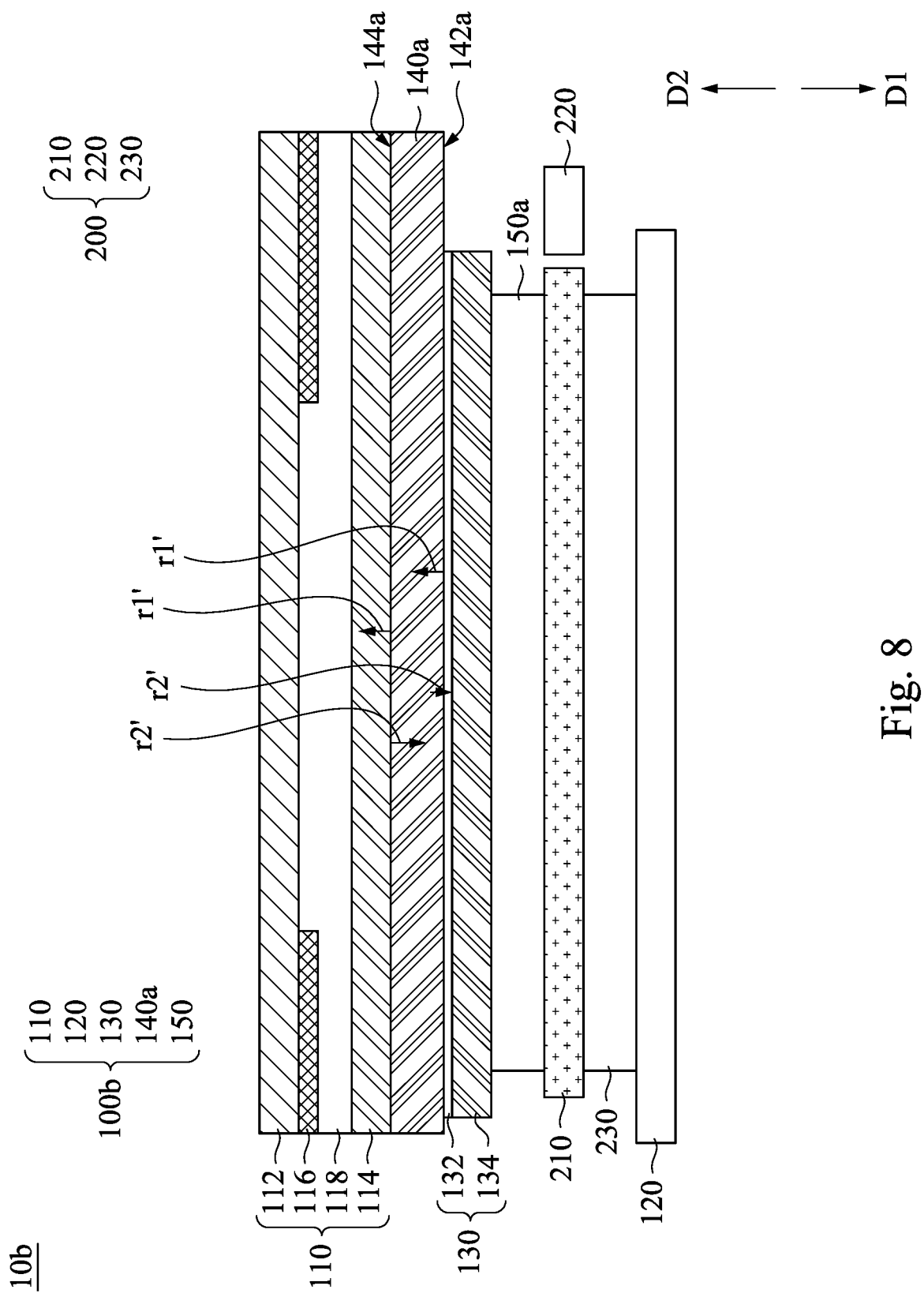
FIG. 8 is a cross-sectional view of a display device according to another embodiment of the present disclosure.

FIG. 8 is a cross-sectional view of a display device 10b according to another embodiment of the present disclosure. The display device 10b is substantially the same as the display device 10 shown in FIG. 1, and the difference is that the display device 10b includes a medium layer 140a between the composite cover structure 110 and the touch module 130. The display device 10b has no medium layer 150a (see FIG. 1) located between the light guide plate 210 and the touch module 130, but has an optical adhesive layer 150. Therefore, the medium layer 140a has an interface 142a and an interface 144a respectively faces and is in contact with the touch module 130 and the second plate 114. The interface 142a and the interface 144a may increase the reflection light r1' such that the interface reflection light r1 (see FIG. 2) is increased. The interface 142a and the interface 144a may increase the reflection light r2' such that the interface reflection light r2 (see FIG. 3) is increased. The variation trend of the display device 10b when the front light module 200 is respectively turned on and turned off is the same as that of the display device 10, and the description will not be repeated hereinafter.

FIG. 9 is experiment data of the optical contrast and the variation of the optical contrast according to various embodiments in FIG. 6. In the present embodiment, optical properties of the display device under different conditions are measured, for example, by a light-splitting brightness photometer (e.g., PR-655, TEO Co., Ltd.). Reference is made to FIG. 6 and FIG. 9, the experiment data in the third column and the fourth column in FIG. 9 are respectively derived based on the conventional display devices in FIGS. 2 to 5 and the display device 10 in FIG. 1. The optical contrast CROFF represents the optical contrast when the front light module 200 is turned off, and the optical contrast CRON represents the optical contrast when the front light module 200 is turned on. The variation of the optical contrast ΔCR is derived from the relation (CRON−CROFF)/CROFF.

According to the data in FIG. 6 and FIG. 9, the variation of the optical contrast ΔCR of the display device 10 is reduced and shows the same trend as that of the simulation data. Since the refractive index of the medium layer 150a of the display device 10 is lower, thereby enhancing the wave guide effect of the light guide plate 210. In other words, if the refractive index of the material overlying the light guide plate 210 is lower, the ratio of the light has the total reflection and transmits toward the reflective display panel 120 is increased. Therefore, compare to the simulation data, the data in FIG. 9 shows that the optical contrast when the front light module 200 is turned on may be increased and the variation of the optical contrast ΔCR of the display device 10 may be decreased at the same time by disposing the medium layer 150a. In addition, since the complexity of the laminated structure of the display device 10 will not be increased by replacing the conventional optical adhesive layer with the medium layer 150a, the difficulty for adjusting the variation of the optical contrast ΔCR will not be increased and the original mechanism design of the display device 10 will not be damaged.

FIG. 10 is simulation data of the refractive index according to the display devices in FIG. 1, FIG. 7, and FIG. 8. The first column and the second column in FIG. 10 is simulation data of the refractive indexes according to the display device 10 in FIG. 1. The third column and the fourth column in FIG. 10 is simulation data of the refractive indexes according to the display device 10a in FIG. 7. The fifth column and the sixth column in FIG. 10 is simulation data of the refractive indexes according to the display device 10b in FIG. 8. The effective refractive index represents the simulation data of the effective refractive index of the various structures between the first plate 110 and the light guide plate 210. The simulation data of the effective refractive index of the display device 10 is about 1.2688. The simulation data of the effective refractive index of the display device 10a is about 1.2688. The simulation data of the effective refractive index of the display device 10b is about 1.2566. Accordingly, since the medium layer of which the refractive index can be adjusted is located between the first plate 112 and the light guide plate 210, the effective index of the various structures between the first plate 112 and the light guide plate 210 may be decreased by replacing the conventional optical adhesive layer (refractive index 1.474) with the medium layer. In other words, the medium layer may reduce the effective refractive index of the mediums overlying the light guide plate 210, thereby enhancing the wave guide effect of the light guide plate 210. Therefore, the display device 10a and the display device 10b have similar advantages with that of the display device 10, and the description will not be repeated hereinafter.

Reference is made to data in the seventh column of FIG. 6, which represents the simulation data derived from another display device used as the control group. This display device is an aforementioned display device of which the optical adhesive layer 230 of the front light module 200 is replaced by a medium layer with a refractive index greater than or equal to 1 and smaller than 1.474. According to the data in the seventh column, the light flux N when the front light module 120 is turned on and the reflective display panel 120" is in dark state is increased. Reference is made to FIG. 4, when the difference between the refractive indexes of the light guide plate 210 and the optical adhesive layer 230 is increased (that is, the optical adhesive layer 230 is replaced by the medium layer), it can be seen that the light guiding effect toward the second direction D2 such that the light L1 is increased. The interface between the light guide plate 210 and the medium (that is the position of the optical adhesive layer 230) has no contribution to the reflection light r3, thereby increasing the light flux N when the front light module 200 is turned on. As such, the optical contrast (N+N')/N when the front light module 200 is turned on is increased. In addition, the variation of the optical contrast ΔCR of the display device under this condition is merely a little bit lower than the variation of the optical contrast ΔCR of the conventional display device.

Reference is made to the data in the eighth column of FIG. 6, which represents the simulation data derived from another display device used as the experimental group. This display device has a medium layer disposed on the surface of the first plate 112 facing away from the second plate 114, and the medium layer has a refractive index greater than or equal to 1 and smaller than 1.474. Such structure may be considered as an anti-glare design for the surface of the display device. Therefore, as shown in the data in the eighth column, the light flux F when the front light module 200 is turned off and the reflective display panel 120" is in dark state decreased dramatically, and the light flux (F+F')/F when the front light module 200 is turned off is increased dramatically. As such, the variation of the optical contrast ΔCR is increased. It is known based on the data in the seventh column and the eighth column, the variation of the optical contrast ΔCR may be decreased dramatically by disposing the medium layer with lower refractive index between the first plate 112 and the light guide plate 210.

Figure 11:
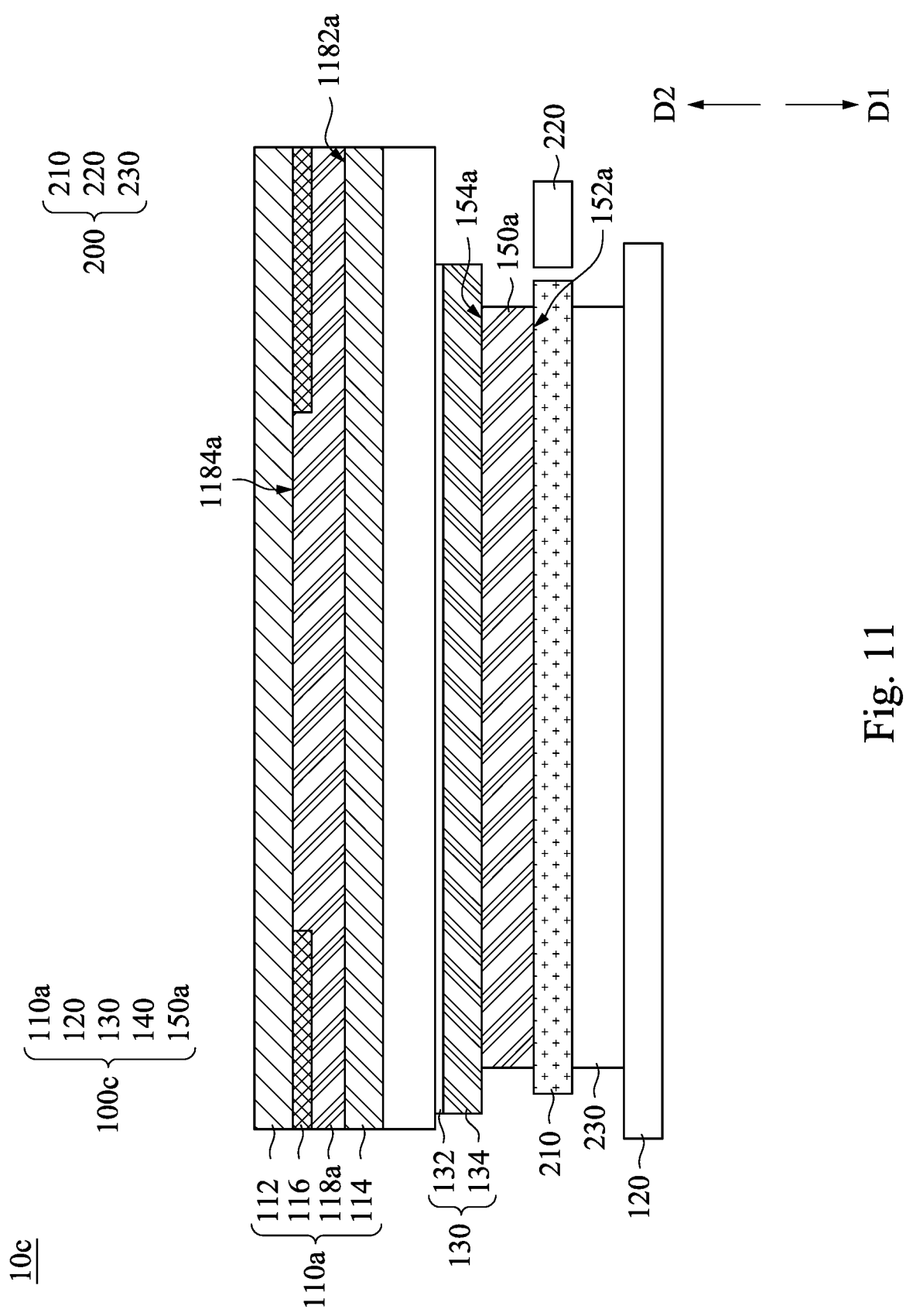
FIG. 11 is a cross-sectional view of a display device according to another embodiment of the present disclosure.

FIG. 11 is a cross-sectional view of a display device 10c according to another embodiment of the present disclosure. The display device 10c is substantially the same as the display device 10 in FIG. 1, and the difference is that the display device 10c further includes a medium layer 118a located between the first plate 112 and the second plate 114. In other words, the medium layer 118a of the display device 10c has an interface 1182a and an interface 1184a respectively faces and is in contact with the second plate 114 and the first plate 112, and the medium layer 150a has an interface 152a and an interface 154a respectively faces and is in contact with the light guide plate 210 and the touch layer 134. The interface 1182a and the interface 1184a may increase the reflection light r1' such that the interface reflection light r1 (see FIG. 2) is increased. The interface 1182a and the interface 1184a may increase the reflection light r2' such that the interface reflection light r2 (see FIG. 3) is increased. The variation trend of the display device 10a when the front light module 200 is respectively turned on and turned off are the same as that of the display device 10, and the description will not be repeated hereinafter. As described above about the advantages of the display device 10, since the difference of the refractive indexes of the aforementioned interfaces and the adjacent material is increased, the reflection light is increased. Therefore, the display device 10c also has the advantages of the display device 10, and the description will not be repeated hereinafter.

Reference is made to FIG. 6 and FIG. 9 simultaneously. The data in the fifth column in FIG. 6 represents the simulation data based on the display device 10c in FIG. 11. The fifth column in FIG. 9 represents the experimental data derived based on the display device 10c. It is known based on the data in FIG. 6 and FIG. 9, since the refractive indexes of the medium layer 150a and the medium layer 118a of the display device 10c are lower, thereby enhancing the wave guide effect of the light guide plate 210. In addition, it is known based on the experimental data in FIG. 9, the variation of the optical contrast ΔCR of the display device 10c is lower than the variation of the optical contrast ΔCR of the display device 10. Accordingly, if the number of the medium layer with lower refractive index is larger, the effect of decreasing the variation of the optical contrast ΔCR may be enhanced. In other words, the effect of decreasing the variation of the optical contrast ΔCR may be super-positioned by disposing more medium layers with low refractive index.

Figure 12:
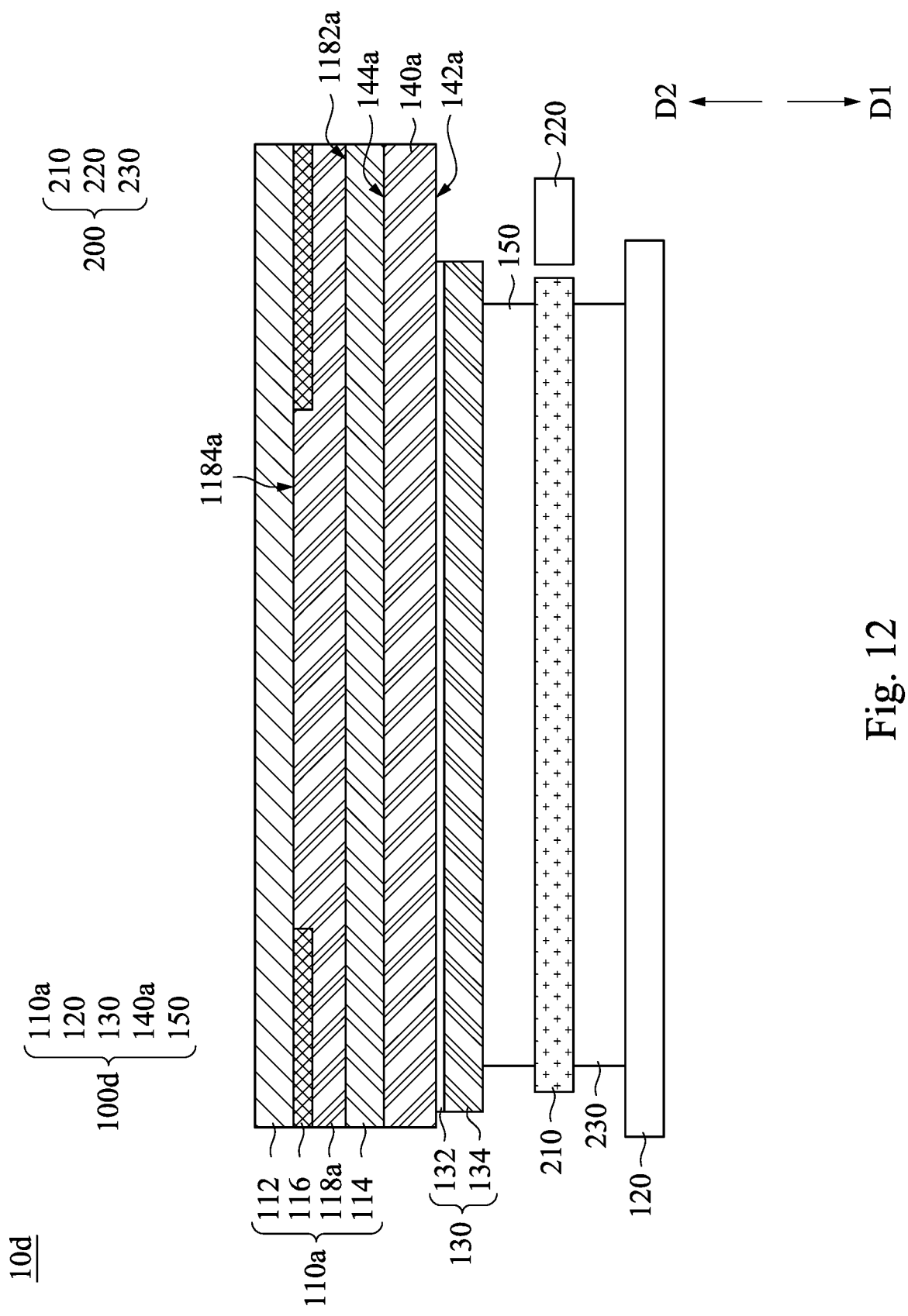
FIG. 12 is a cross-sectional view of a display device according to another embodiment of the present disclosure.

FIG. 12 is a cross-sectional view of a display device 10d according to another embodiment of the present disclosure. The display device 10d is substantially the same as the display device 10a in FIG. 7, and the difference is that the display device 10d further includes a medium layer 140a located between the composite cover structure 110a and the touch module 130. In other words, the medium layer 118a of the display device 10d has an interface 1182a and an interface 1184a respectively faces and is in contact with the second plate 114 and the first plate 112, and the medium layer 140a has an interface 142a and an interface 144a respectively faces and is in contact with the touch module 130 and the second plate 114. As described above about the advantages of the display device 10, since the difference of the refractive indexes of the aforementioned interfaces and the adjacent material is increased, the reflection light is increased. Therefore, the display device 10d also has the advantages of the display device 10, and the description will not be repeated hereinafter.

Figure 13:
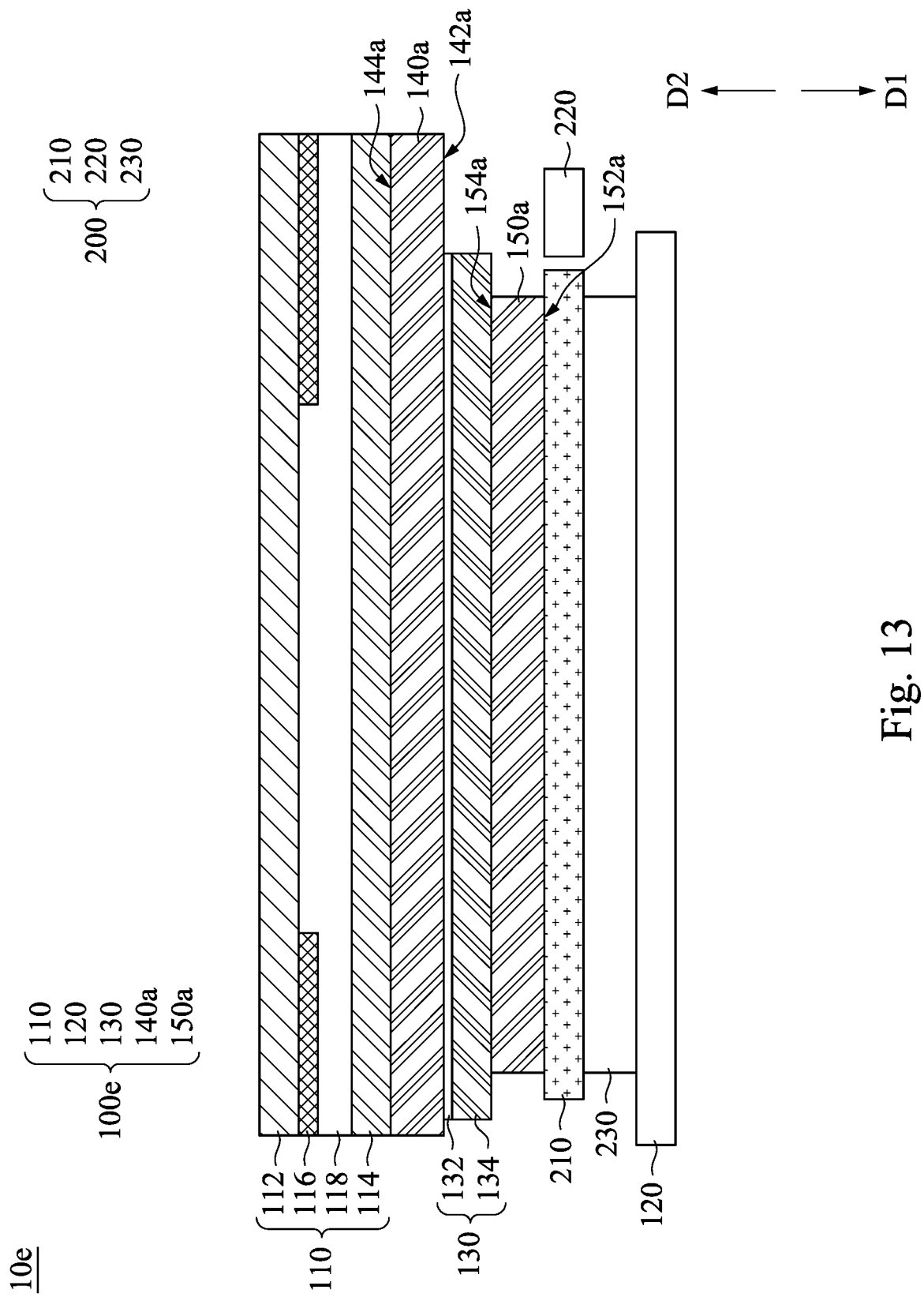
FIG. 13 is a cross-sectional view of a display device according to another embodiment of the present disclosure.

FIG. 13 is a cross-sectional view of a display device 10e according to another embodiment of the present disclosure. The display device 10e is substantially the same as the display device 10b in FIG. 8, and the difference is that the display device 10e further includes a medium layer 150a located between the light guide plate 210 and the touch module 130. In other words, the medium layer 140a of the display device 10e has an interface 142a and an interface 144a respectively faces and is in contact with the touch module 130 and the second plate 114, and the medium layer 150a has an interface 152a and an interface 154a respectively faces and is in contact with the light guide plate 210 and the interface 152a and the interface 154a of the touch layer 134. As described above about the advantages of the display device 10, since the difference of the refractive indexes of the aforementioned interfaces and the adjacent material is increased, the reflection light is increased. Therefore, the display device 10e also has the advantages of the display device 10, and the description will not be repeated hereinafter.

Figure 14:
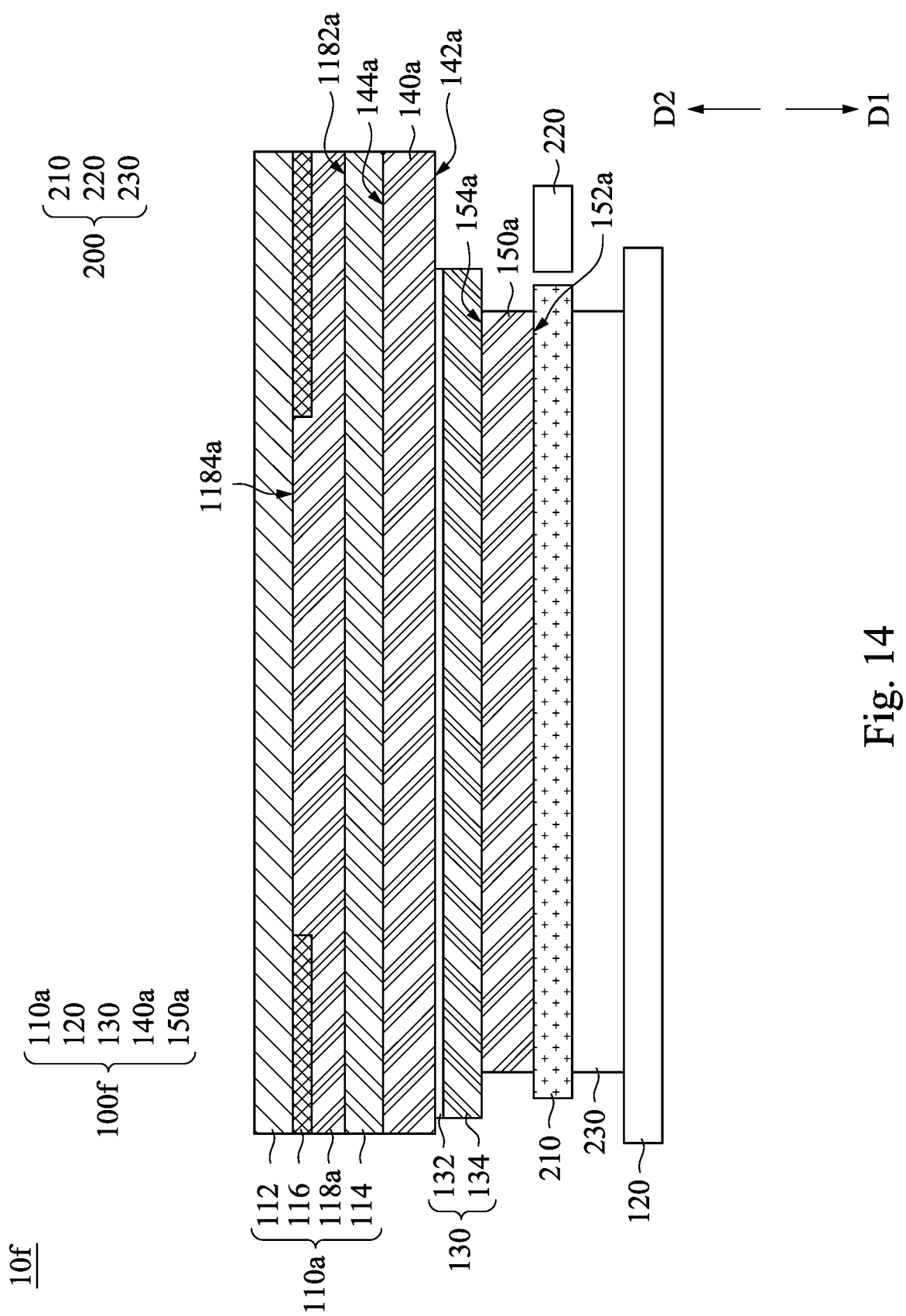
FIG. 14 is a cross-sectional view of a display device according to another embodiment of the present disclosure.

FIG. 14 is a cross-sectional view of a display device 10f according to another embodiment of the present disclosure. The display device 10f is substantially the same as the display device 10e in FIG. 13, and the difference is that the display device 10f further includes a medium layer 118a located between the first plate 112 and the second plate 114. In other words, the display device 10f has three interfaces. The medium layer 118a of the display device 10f has an interface 1182a and an interface 1184a respectively faces and is in contact with the first plate 112 and the second plate 114, and the medium layer 150a has an interface 152a and an interface 154a respectively faces and is in contact with the light guide plate 210 and the interface 152a and the interface 154a of the touch layer 134. As described above about the advantages of the display device 10, since the difference of the refractive indexes of the aforementioned interfaces and the adjacent material is increased, the reflection light is increased. Therefore, the display device 10e also has the advantages of the display device 10, and the description will not be repeated hereinafter.

FIG. 15 is simulation data of the refractive index according to the display devices in FIG. 11, FIG. 12, FIG. 13, and FIG. 14. The first column and the second column in FIG. 15 are simulation data of the refractive index based on the lamination structure of the display device 10c in FIG. 11. The third column and the fourth column in FIG. 15 are simulation data of the refractive index based on the lamination structure of the display device 10d in FIG. 12. The fifth column and the sixth column in FIG. 15 are simulation data of the refractive index based on the lamination structure of the display device 10e in FIG. 13. The seventh column and the eighth column in FIG. 15 are simulation data of the refractive index based on the lamination structure of the display device 10f in FIG. 14. The effective refractive index shown in the figure represents the simulation data of the effective refractive index of each of the structures between the first plate 112 and the light guide plate 210. The effective refractive index of the display device 10c is about 1.243. The effective refractive index of the display device 10d is about 1.232. The effective refractive index of the display device 10e is about 1.232. The effective refractive index of the display device 10f is about 1.21. Accordingly, the simulation data of the effective index of the various structures between the first plate 112 and the light guide plate 210 may be decreased by replacing the conventional optical adhesive layer (refractive index 1.474) with the medium layer. In other words, the medium layer may reduce the effective refractive index of the mediums overlying the light guide plate 210, thereby enhancing the wave guide effect of the light guide plate 210. Therefore, the display device 10c, the display device 10d, the display device 10e, and the display device 10f have similar advantages with that of the display device 10, and the description will not be repeated hereinafter. In addition, the display device 10c, the display device 10d, the display device 10e have lower simulation data of the refractive index comparing to the simulation data of the effective refractive index shown in FIG. 10, which is coherent with the experimental data in FIG. 9. That is, the effect of reducing the variation of the optical contrast ΔCR may be super-positioned. Similarly, the simulation data of the effective refractive index of the display device 10f is lower than the effective refractive indexes of the display device 10c, the display device 10d, and the display device 10e. Accordingly, the display device 10c, the display device 10d, and the display device 10e, and the display device 10f all have the same advantages as the display device 10 in FIG. 1. In addition, if the number of the medium layer is larger, the effect of decreasing the variation of the optical contrast ΔCR may be enhanced.

Figure 16:
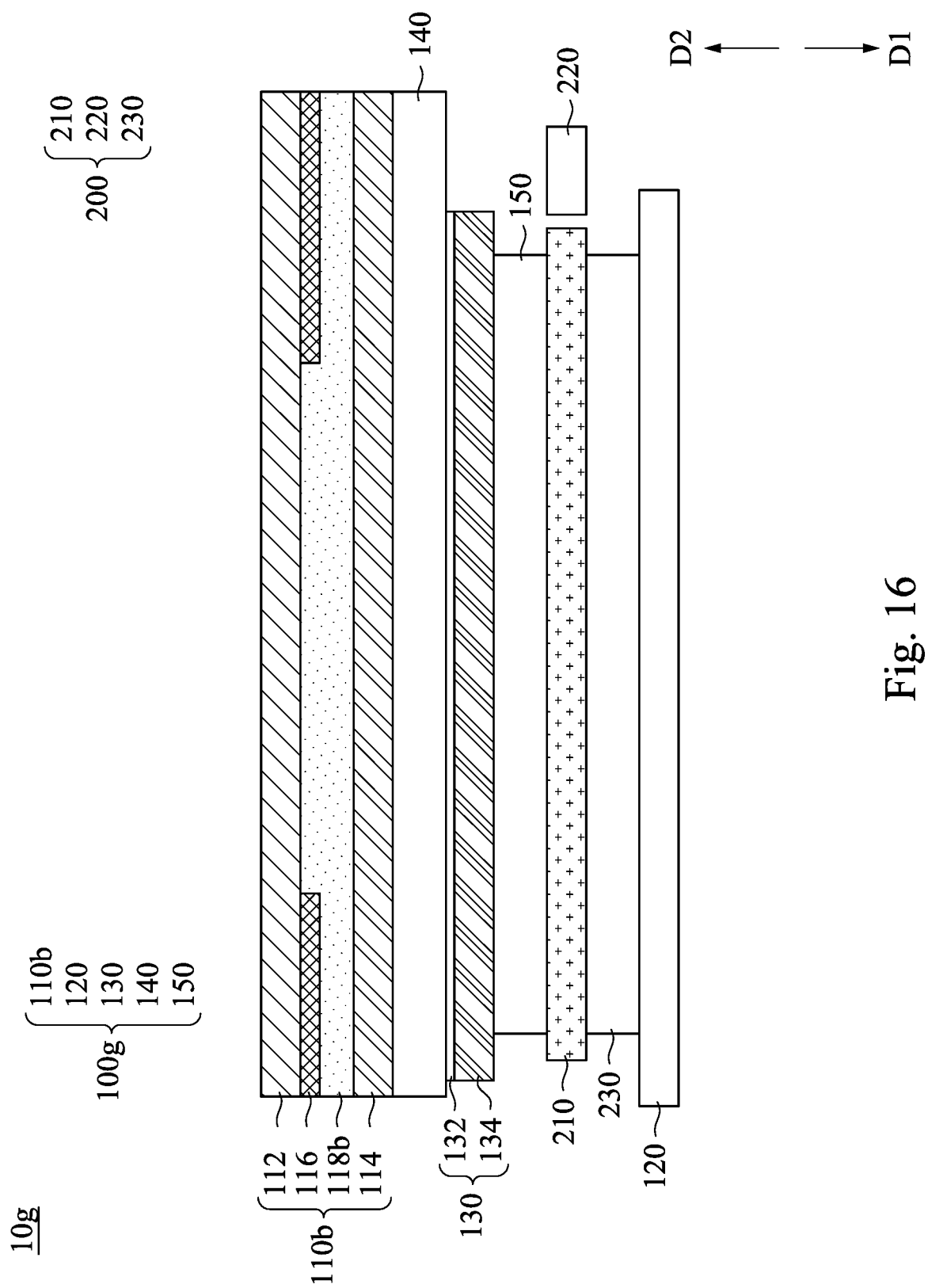
FIG. 16 is a cross-sectional view of a display device according to another embodiment of the present disclosure.

FIG. 16 is a cross-sectional view of a display device 10g according to another embodiment of the present disclosure. The display device 10g is substantially the same as the display device 10a in FIG. 7, and the difference is that the medium layer 118b of the composite cover structure 110b of the display device 10g is an air layer (refractive index is 1.0). In other words, the first plate 112 and the second plate 114 of the composite cover structure 110b are in contact with the air layer, respectively. As described above, since the difference of the refractive indexes of the medium layer 118b and the first plate 112 is increased, the reflection light of the surface of the first plate 112 facing the medium layer 118b is increased. Similarly, since the refractive index between the medium layer 118b and the second plate 114 is increased, the reflection light of the surface of the second plate 114 facing the medium layer 118b is increased.

Reference is made to FIG. 6 and FIG. 9, the data in the sixth column of FIG. 6 represents the simulation data of the display device 10g in FIG. 16. The data in the sixth column of FIG. 9 represents the experimental data of the display device 10g. It is known based on the data in FIG. 6 and FIG. 9, since the refractive index of the medium layer 118b of the display device 10g is lower, thereby enhancing the wave guide effect of the light guide plate 210. In addition, it is known based on FIG. 9, the optical contrast CRON when the front light module 200 is turned on is greater than the optical contrast CROFF when the front light module 200 is turned off by replacing the conventional optical adhesive layer with the air layer. In other words, if the refractive index of the medium layer that is used to replace the conventional optical adhesive layer is lower, the variation of the optical contrast ΔCR may be reduced and the optical contrast CRON when the front light module 200 is turned on may be increased.

Figure 17:
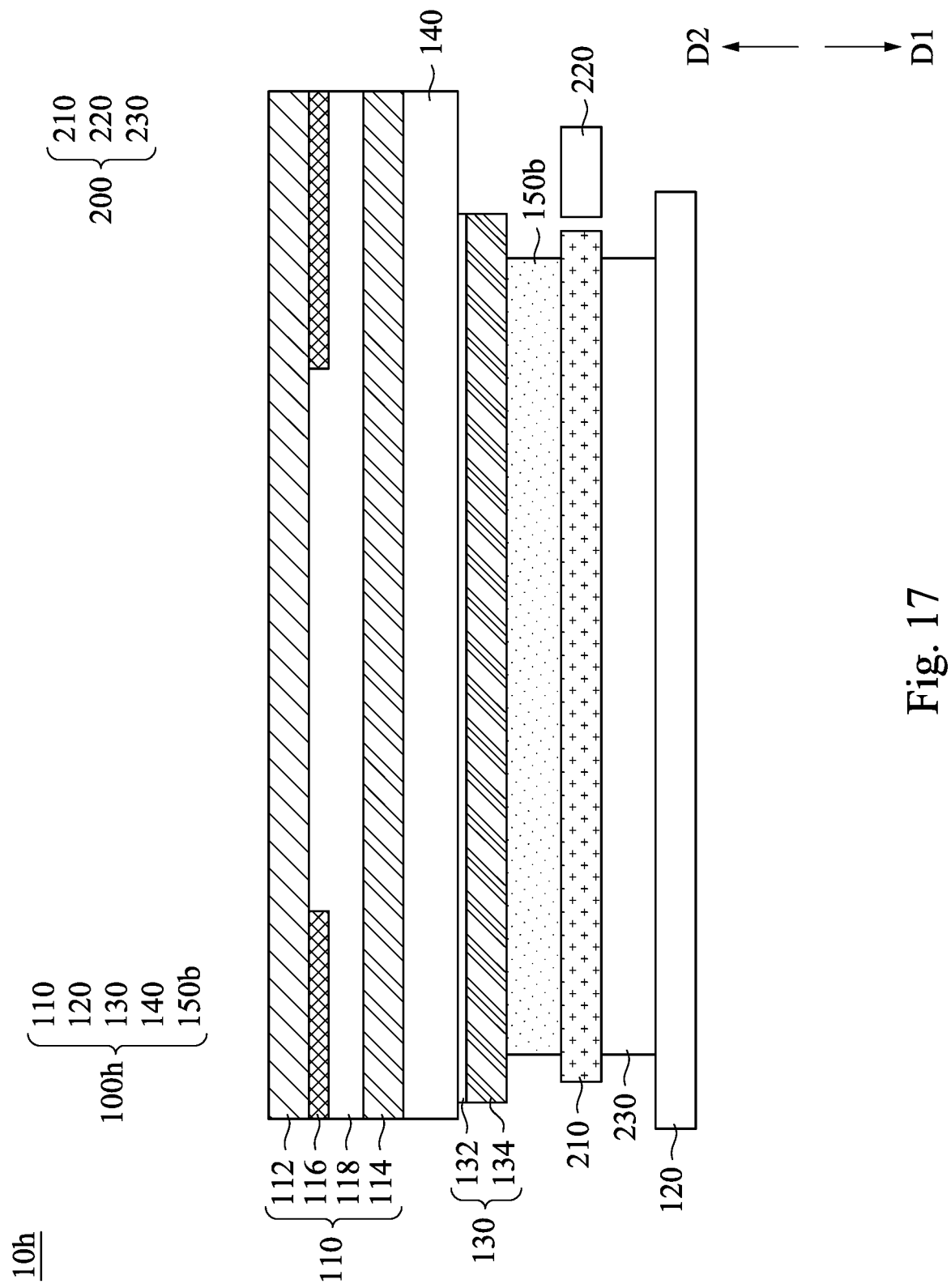
FIG. 17 is a cross-sectional view of a display device according to another embodiment of the present disclosure.

FIG. 17 is a cross-sectional view of a display device 10h according to another embodiment of the present disclosure. The display device 10h is substantially the same as the display device 10 in FIG. 1, and the difference is that the display device 10h includes the medium layer 150b, and the medium layer 150b is an air layer (refractive index is 1). In other words, the light guide plate 210 and the touch module 130 of the display device 10h are in contact with the air layer, respectively. As described above, since the difference of the refractive indexes of the medium layer 150b and the light guide plate 210 is increased, the reflection light of the surface of the light guide plate 210 facing the medium layer 150b is increased. Similarly, since the refractive index between the medium layer 118b and the second plate 114 is increased, the reflection light of the surface of the second plate 114 facing the medium layer 118b is increased. As described above, the medium layer 150b may decrease the effective refractive index of the medium overlying the light guide plate 210, thereby enhancing the wave guide effect of the light guide plate 210. The display device 10h also has the advantages of the display device 10, and the description will not be repeated hereinafter.

FIG. 18 is experiment data of the optical contrast and the variation of the optical contrast according to various embodiments in FIG. 16 and FIG. 17. Reference is made to FIG. 18 and FIG. 9, the third column of FIG. 18 is the experimental data derived based on the display device 10h. It can be known by comparing the data in the third column of FIG. 18 and the data in the sixth column of FIG. 9 (that is the experimental data of the display device 10g), the optical contrast CRON when the front light module 200 is turned on is greater when the air layer is closer to the light guide plate 210. In other words, the wave guide effect is stronger when the medium layer with low refractive index is closer to the light guide plate 210. The optical contrast CRON when the front light module 200 is turned on is greater than the optical contrast CROFF when the front light module 200 is turned off, and thus the value of the variation of the optical contrast ΔCR is positive.

It is noted that, in the present embodiment, to compare with the aforementioned embodiment clearly, merely the medium layer 150b is modified. Therefore, the result that the absolute value of the variation of the optical contrast ΔCR of the display device 10h is greater than the value of the variation of the optical contrast ΔCR of the conventional display device represents that the medium layer 150b has better effect of increasing the optical contrast CRON when the front light module 200 is turned on.

In some embodiment, the display device may have other functional modules and other functional films such as the Colorless Polyimide (CPI) film and/or barrier coating applied in a foldable display panel. The functional module or the function film may include the material that may increase the variation of the optical contrast ΔCR. For example, the refractive index of the Colorless Polyimide film is about 1.6, and the refractive index of the barrier coating is greater than 1.6. Under this condition, the variation of the optical contrast ΔCR of the display device may be adjusted to a value close to zero by disposing the air layer as shown in the display device 10h (see the medium layer 150b in FIG. 17). In other words, there is no need to remove the material with high refractive index overlying the light guide plate in the design of the present embodiment, and the effect of reducing the variation of the optical contrast ΔCR to a value close to zero can be achieved by disposing the air layer on the light guide plate 210 so as to improve the scene experience of the users.

Figure 19:
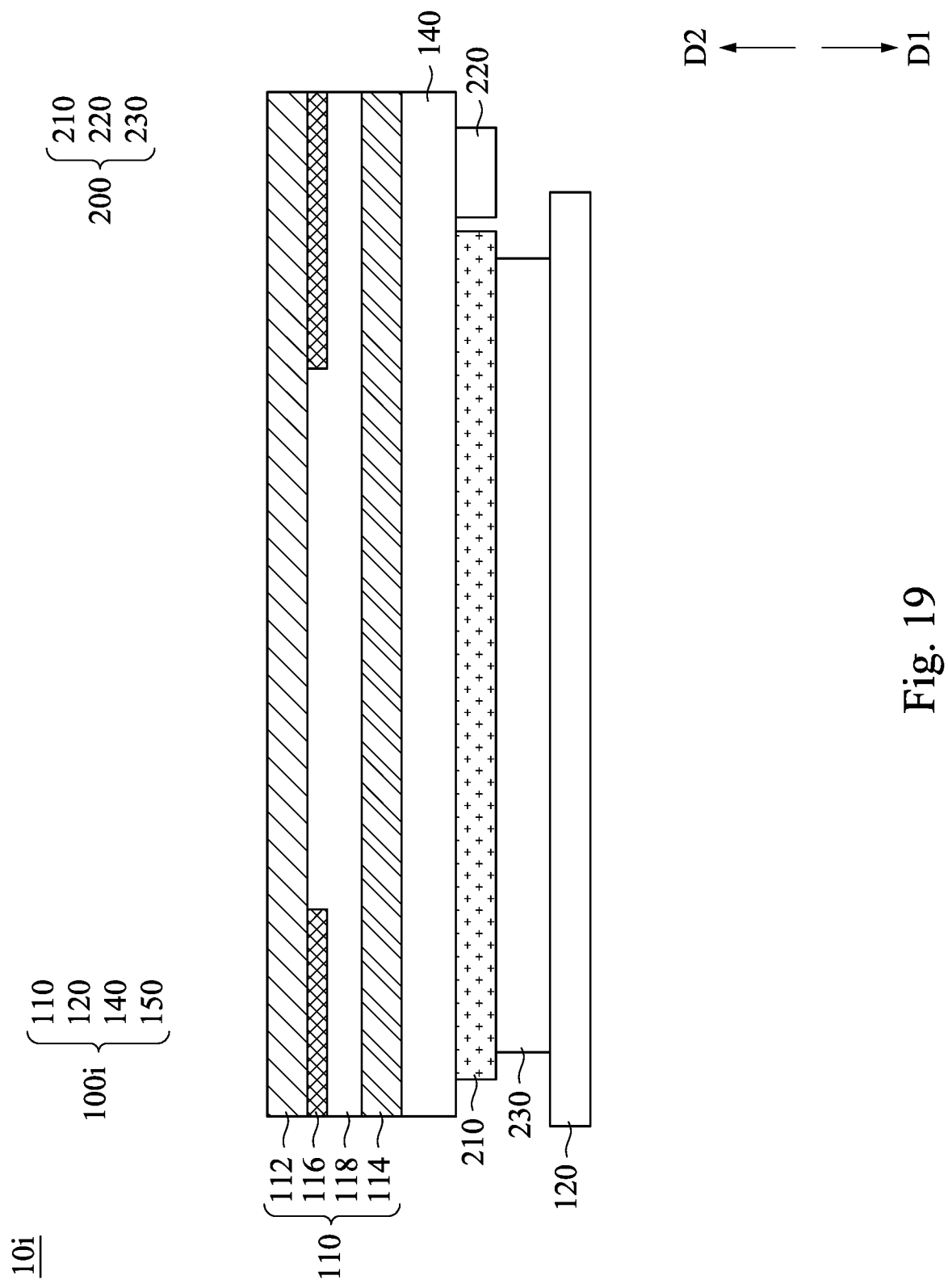
FIG. 19 is a cross-sectional view of a display device according to another embodiment of the present disclosure.

FIG. 19 is a cross-sectional view of a display device 10i according to another embodiment of the present disclosure. Reference is made to FIG. 18 and FIG. 19, the fourth column of FIG. 18 is the experimental data based on the display device 10i. The display device 10i is substantially the same as the display device 10, and the difference is that the display device 10i has no touch module 130 located between the composite cover structure 110 and the front light module 200 (see FIG. 1). In other words, the number of the interface between the first plate 112 and the light guide plate 210 is reduced. It is known by comparing the data in the fourth column of FIG. 18 and the third column of FIG. 9 (that is the experimental data of the conventional display device), the optical contrast CRON of the present embodiment when the front light module 200 is turned on and the optical contrast CROFF when the front light module 200 is turned off are both increased dramatically, and the variation of the optical contrast ΔCR is also lower than the variation of the optical contrast ΔCR (see FIG. 9) of the conventional display device. Specifically, since the number of the layers of the display device 10i is reduced and the amount of interface reflection is reduced, optical contrast CROFF when the front light module 200 is turned off is reduced. In addition, since the electrode layer 132 of the touch module 130 (see FIG. 1) has high refractive index, such configuration is not beneficial to the wave guide effect of the light guide plate 210. Since the display device 10i has no electrode layer 132 located between the composite cover structure 110 and the light guide plate 210, the optical contrast CRON when the front light module 200 is turned on is increased.

According, the variation of the optical contrast ΔCR can be reduced and the optical contrast CRON when the front light module 200 is turned on can be increased by reducing the number of the layers between the light guide plate 210 and the first plate 112. In addition, it can be seen that the effective refractive index of the medium overlying the light guide plate 210 is reduced by avoid to dispose the electrode with high refractive index between the composite cover structure 110 and the light guide plate 210. In some embodiments, the touch module (see FIG. 1) or other functional modules can be disposed between the light guide plate 210 and the display panel 120, and the aforementioned design about the medium layer (e.g., the optical adhesive layer with refractive index 1.414) may be utilized in the display device 10i. In other words, the present disclosure may provide the medium overlying the light guide plate 210 with lower effective refractive index by adjusting the lamination structure and the refractive index of the medium layers, such that the variation of the optical contrast ΔCR may be adjusted to a value close to zero and the scene experience of the users may be improved.

In summary, the optical contrast when the front light module is turned on and the optical contrast when the front light module is turned off may be balanced by replacing the conventional optical adhesive layer (refractive index 1.474) with the medium layer of which the refractive index is greater than or equal to one and is smaller than 1.474. In other words, the display device of the present disclosure can reduce the variation of the optical contrast through the medium layer so as to improve the scene experience of the users. In some embodiments, the display device of the present disclosure can enhance the optical contrast when the front light module is turned on through the medium layer. In addition, since the complexity of the laminated structure of the display device will not be increased by replacing the conventional optical adhesive layer with the medium layer, the difficulty for adjusting the variation of the optical contrast will not be increased and the original mechanism design of the display device will not be damaged.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A functional module, applied in a front light module of a display device, comprising:
 a composite cover structure having a first plate and a second plate;
 a reflective display panel, wherein the second plate is located between the first plate and the reflective display panel;
 a touch module having an electrode layer and a touch layer below the electrode layer, wherein the electrode layer is located between the second plate of the composite cover structure and the touch layer, and the touch layer is located between the electrode layer and the reflective display panel; and
 at least two medium layers located between the first plate of the composite cover structure and the reflective display panel, wherein the refractive index of the medium layers is greater than or equal to 1 and is smaller than 1.474, the touch module is located between the composite cover structure and the reflective display panel, one of the medium layers is located between the first plate and the second plate, and another one of the medium layers is located between the touch module and the reflective display panel.

2. The functional module of claim 1, a number of the medium layers is three, and comprises said one of the medium layers, said another one of the medium layers, and a third medium layer, the third medium layer being located between the touch module and the second plate.

3. A display device, comprising:
 a front light module having a light guide plate and a light source; and
 a functional module, comprising:
 a composite cover structure having a first plate and a second plate;
 a reflective display panel, wherein the front light module is located between the first plate and the reflective display panel;
 a touch module having an electrode layer and a touch layer below the electrode layer, wherein the electrode layer is located between the second plate of the composite cover structure and the touch layer, and the touch layer is located between the electrode layer and the reflective display panel; and
 at least two medium layers located between the first plate of the composite cover structure and the light guide plate, wherein the refractive index of the medium layers is greater than or equal to 1 and is smaller than 1.474, the touch module is located between the composite cover structure and the light guide plate, one of the medium layers is located between the second plate and the touch module, and another one of the medium layers is located between the touch module and the light guide plate.

4. The display device of claim 3, wherein a number of the medium layers is three, and comprises said one of the medium layers, said another one of the medium layers, and a third medium layer, the third medium layer being located between the first plate and the second plate.

5. The display device of claim 3, wherein one of the medium layers is an air layer.

6. The display device of claim 5, wherein the air layer is located between the first plate and the second plate of the composite cover structure.

7. The display device of claim 5, wherein the air layer is located between the touch module and the light guide plate.

* * * * *